United States Patent [19]

Rosenstrach et al.

[11] Patent Number: 4,664,417

[45] Date of Patent: May 12, 1987

[54] FOREIGN CURRENCY DISPENSER ENVELOPE

[76] Inventors: Ivan Rosenstrach, 2 Guon La., Larchmont, N.Y. 10538; Robert Steinthal, One Horizon Rd., Fort Lee, N.J. 07024

[21] Appl. No.: 830,082

[22] Filed: Feb. 18, 1986

Related U.S. Application Data

[63] Continuation-in-part of Ser. No. 763,243, Aug. 7, 1985, abandoned.

[51] Int. Cl.[4] .......................... B42D 15/00; B31B 1/62; G06K 15/00

[52] U.S. Cl. .......................... 283/1 B; 493/254; 235/383

[58] Field of Search .......................... 283/1 B, 54, 57, 1 R; 282/11.5 R, 22 R, 25; 229/68 R, 76; 235/383, 454; 493/383, 254, 186

[56] References Cited

U.S. PATENT DOCUMENTS

| | | | |
|---|---|---|---|
| 1,944,794 | 1/1934 | Klinger | 493/254 |
| 2,142,374 | 1/1939 | Randolph | 283/1 B |
| 2,484,880 | 10/1949 | Flood | 156/DIG. 48 |
| 3,666,926 | 5/1972 | Conte, Jr. et al. | 283/1 B |
| 3,770,941 | 11/1973 | Gechele et al. | 235/383 |
| 3,933,094 | 1/1976 | Murphy et al. | 283/1 B |
| 4,002,886 | 1/1977 | Sundelin | 235/383 |
| 4,518,852 | 5/1985 | Stockburger | 235/383 |
| 4,529,871 | 7/1985 | Davidson | 235/383 |

*Primary Examiner*—Paul A. Bell
*Assistant Examiner*—Paul M. Heyrana, Sr.
*Attorney, Agent, or Firm*—Hopgood, Calimafde, Kalil, Blaustein & Judlowe

[57] ABSTRACT

A currency dispenser packet for facilitating the sale of prepackaged foreign currency at a retail outlet includes an envelope containing a preselected quantity of a currency of a foreign country. The envelope is imprinted with a machine-readable code identifying the contents of the envelope as well as the identity of the seller. The code on the envelope is scanned or "read" at the point of sales and the read data is transmitted to a central station processor at which current foreign currency exchange rates are maintained. The processor computes the cost of the foreign currency in U.S. dollars or currency of purchase as well as the applicable commissions and transmits this information to the point-of-sale location. The packet thus allows foreign currency to be sold at locations dealing with travelers such as travel agencies, airline ticket terminals, and other outlets where such sales have heretofore not been practical. It also makes possible speedier transactions and daily reconciliations since the sales transaction is recorded in the processor. Additionally, the packet and processor system make possible improved currency inventory control by the currency wholesaler and retailer as well as improved security of the foreign currencies being held.

3 Claims, 5 Drawing Figures

FOREIGN CURRENCY DISPENSER ENVELOPE

This is a continuation-in-part of application Ser. No. 763,243 filed Aug. 7, 1985, abandoned.

BACKGROUND OF THE INVENTION

The present invention relates generally to the sale of foreign currency, and more specifically to a dispenser or packet which facilitates the sale of prepackaged amounts of currency to tourists and others planning to visit a foreign country.

At the present time, one who is planning to travel to a foreign country as a tourist or business traveler typically makes arrangements for travel and hotel arrangements through a travel agent. The traveler must then go to a foreign currency dealer or bank dealing in foreign currencies to purchase a quantity of currency of the countries in which he or she intends to travel. The purchaser requests conversion from the local currency to the desired currency. The cashier/seller must determine how much of the desired currency to provide based upon existent exchange rates and the amount the purchaser wants to spend. Additionally, when the currencies being held by the seller are held in trust, the seller must determine how much to remit to the wholesaler or bank, with the difference being the agent's commission. Since each purchaser may elect to spend differing amounts and since exchange rates change constantly, an indeterminate number of currency notes are involved in every transaction.

Additionally, because the desired currencies are sold individually against constantly changing exchange rates and depending upon how much the purchaser wishes to spend, each transaction must be calculated separately for both the selling price to the purchaser and the remitted price to the wholesaler. This has required a cashier environment limiting the number of selling locations requiring on-the-spot delivery of the foreign currencies purchased. It also has required that large stocks of loose notes be carried thus presenting security and inventory problems.

It is an object of the present invention to provide a means for expediting and improving the sale, distribution, delivery, security, and inventory of foreign currency.

It is a further object of the invention to permit the traveler to purchase a desired amount of currency at the same location at which he or she makes other travel arrangements or at the airline ticket terminal prior to departure.

It is another object of the invention to allow travel agents, airlines, and others to sell foreign currency without the need for computing the cost and commission of the purchased currency in a manner that substantially eliminates computational error and which provides the traveler with up-to-date rates of exchange.

To these ends, the present invention provides a novel foreign currency dispenser or packet and a method for its use in which a predetermined amount of foreign currency, five pounds Sterling or 100 French francs, for example, is packaged. The dispenser or packet is encoded along an edge in a machine-readable code. The code identifies the amount and type (nation) of the currency that is prepackaged in the envelope as well as the identification of the currency retailer.

At the time the traveler makes a purchase of the foreign currency packet of the invention, the packet is placed in a code reader which reads the code on the packet. This information is transmitted to a central processor located at a currency wholesaler, which typically may be a bank, at which the current exchange rates are stored and updated. The processor performs the necessary computations to calculate the cost of the packet contents to the purchaser as well as the amount to be remitted to the wholesaler. The processor then transmits that data back to the retailer where this information is displayed and/or printed. The processor has the capacity to store information concerning the foreign currency transactions for a plurality of such retailers each of which is identified by a retailer identification code and carried on the currency packets sold at the retailer's location. The processor also has the capacity to total daily transactions for each retailer by sales and remittance amount thus simplifying daily reconciliations. It also has the capability to track packet inventory to ascertain stock and resupply requirements.

To the accomplishment of the foregoing and such further objects as may hereinafter appear, the present invention relates to an improved foreign currency dispenser-packet substantially as defined in the appended claims and as described in the following detailed specification as considered in conjunction with the accompanying drawings in which:

Figure 1:
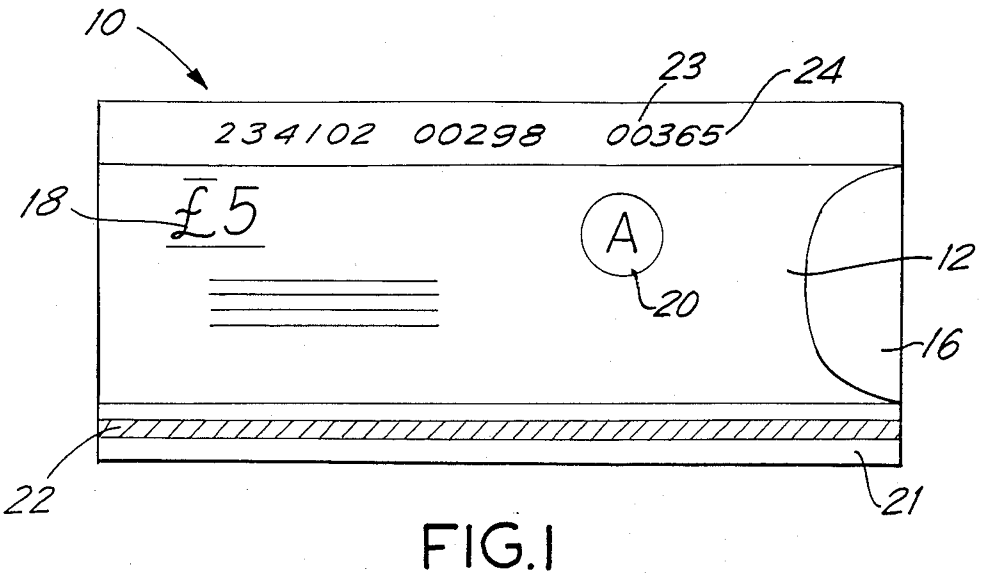
FIG. 1 is a front view of a foreign currency dispenser-packet including features of the present invention.
Figure 2:
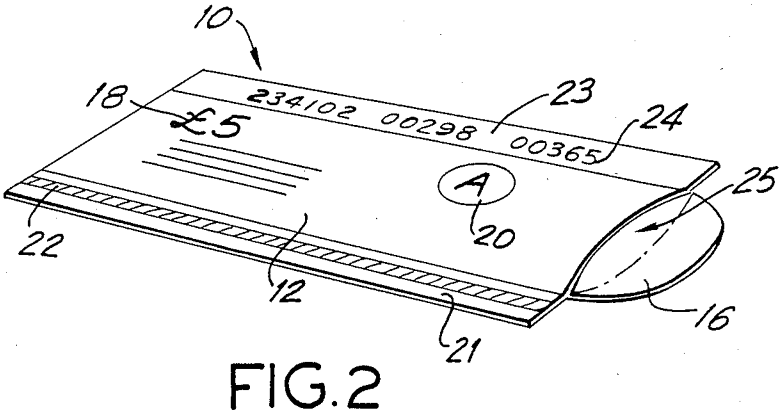
FIG. 2 is an isometric view of the packet showing the strip carrying the encoded data.
Figure 3:
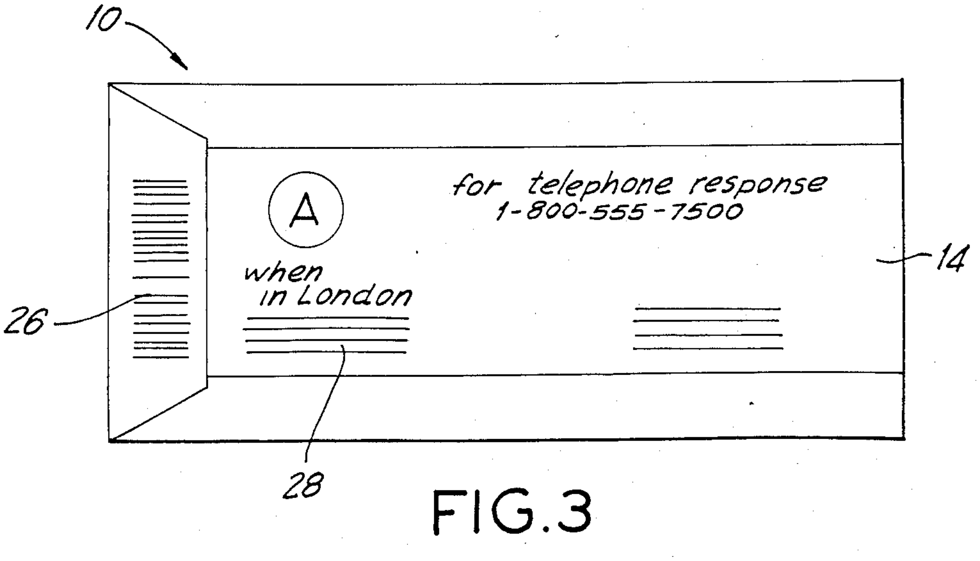
FIG. 3 is a rear view of the foreign currency dispenser packet of FIG. 1.

FIGS. 1, 2, and 3 illustrate an embodiment of the foreign currency dispenser packet of the invention, which, as shown, includes a rectangular envelope or packet 10 having a front face (FIG. 1) an an obverse face 14 (FIG. 2). The envelope 10 has an opening at one end which, after the foreign currency is placed in the envelope, is closed by a gummed flap 16. The flap can be ripped open by the purchaser to gain access to the contents of the envelope, all as conventional.

In accordance with the present invention, the envelope is prepackaged with a known amount of foreign currency, here, shown, for purposes of example, five pounds sterling, or L5. The amount and denomination of the prepackaged currency is printed on the envelope at 18, and a letter code 20, corresponding to the currency amount and denomination, may also be printed on one or both of the faces of the envelope 10. At least the bottom edge 21 of the packet 10 is rigid and along with the upper edge 23 provide end closures for a central currency-holding portion 25 (FIG. 2). A thin strip 22, which may be made of metal or metal oxide, is coded in machine-readable code and is attached to rigid edge 21. The vertical dimension of edge 21 is selected so that when the packet is passed through a code reader, in a manner described below, only the rigid edge 21 with coded strip 22, and not the bulkier and wider central portion 25, will pass through the reader, thereby preventing the wider central portion 25 from becoming stuck in the reader and allowing even a full packet to be readily passed through the reader.

Those portions or strips of the packet carrying the encoded information while an integral part of the packet are not separable; that is, the central portion 25 of the packet that can be opened to insert the currencies is separate from but secured to that portion of the packet, to wit, the rigid edge 21, on which the encoded data is imprinted. Thus, the strips can be dimensioned and encoded to meet established standards for magnetic and optical character readers currently in use or for those being developed.

The coded information contained in coded strip 22 includes the description of the currency, by amount and denomination, and a unique code identifying the retailer or seller of the currency. In addition to, or as an alternative to, the coded strip, this information may be printed in numerical form, which may be read by an optical scanner, as at 24, or as a bar code, as at 26, along the lower edge of the envelope. If desired, the packet 10 may also include travel information or advertising as at 28, which relates to the country whose currency is contained in the packet.

Figure 4:
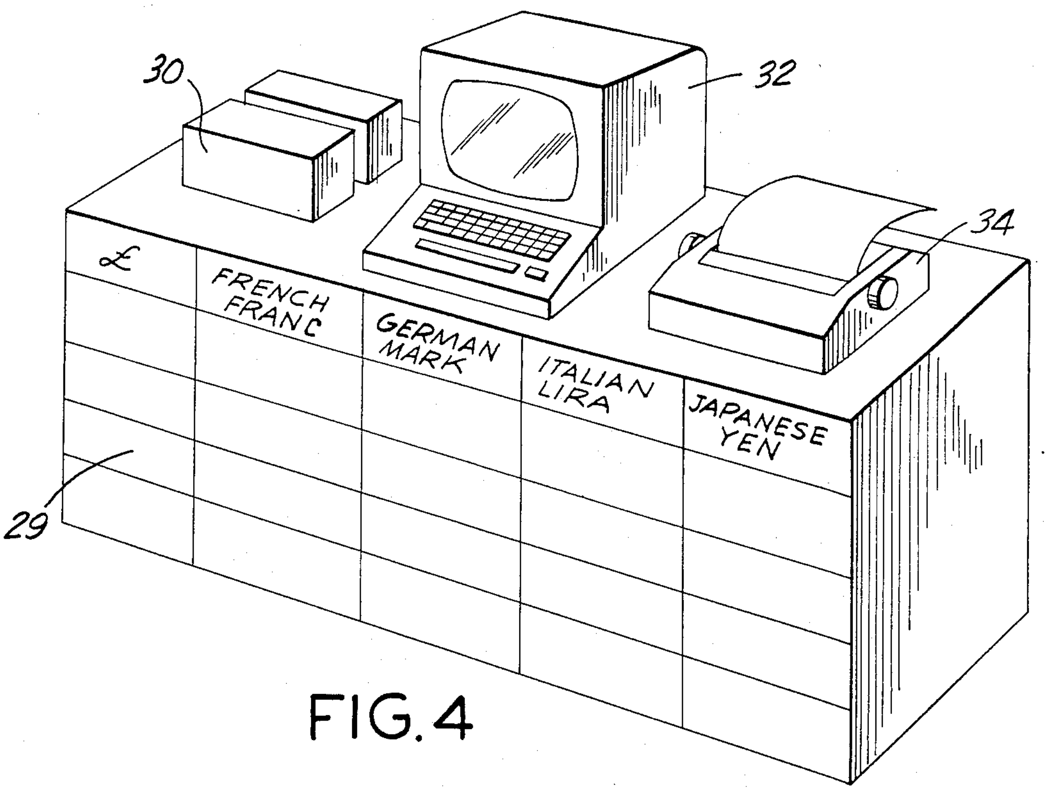
FIG. 4 is a perspective view of a point-of-sale retail currency operation illustrating one use of the foreign currency dispenser-packet of the invention.
Figure 5:
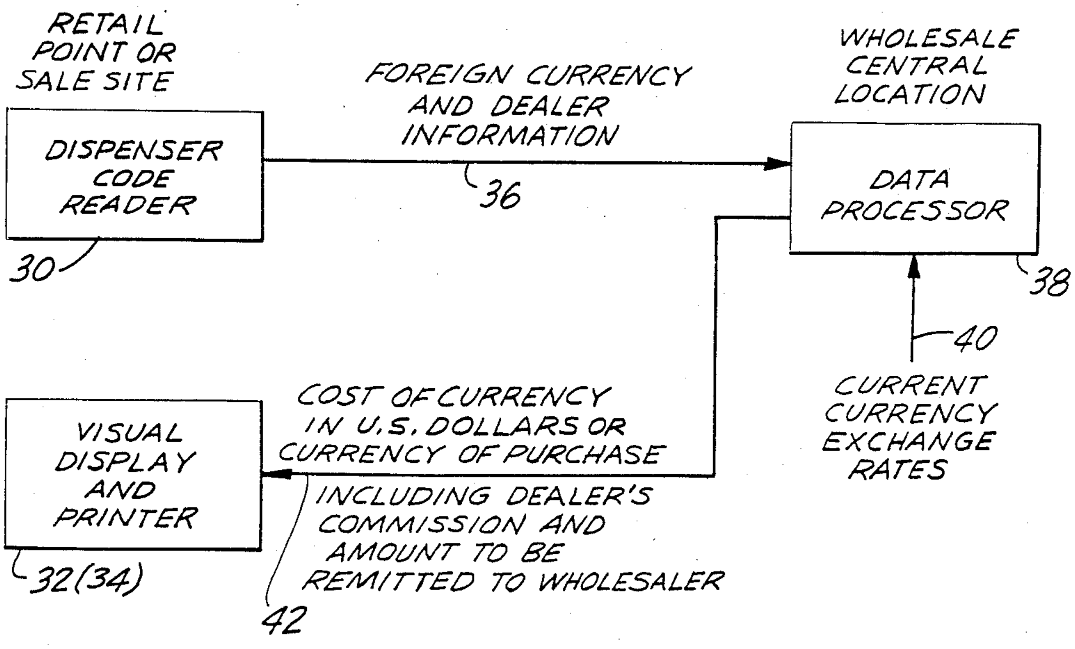
FIG. 5 is a schematic block diagram illustrating the manner in which the foreign currency dispenser-packet of the invention may be used in a foreign currency sales transaction.

FIG. 4 illustrates a typical counter installation from which the foreign currency packet 10 of FIGS. 1 and 2 may be sold to travelers. The counter may, for example, be located at a travel agency or at an airline ticket terminal or similar outlet dealing with travelers to a foreign country. The counter may, as shown, include a series of drawers 29 each of which contains a plurality of one class of prepackaged currency packets; that is, each drawer holds a plurality of prepackaged packets containing the same amount of the currency of a given country. If desired, and as shown, the currencies of a single country, but in different amounts, may be stored in different drawers in one column or stack, each of which is marked by the country of the currency, as also shown in FIG. 3. Mounted on the counter are a code reader 30, a visual display and keyboard 32, and a printer 34.

In operation, as shown schematically in FIG. 4, after a traveler selects the amounts of foreign currency he or she wishes to purchase, coded foreign currency packets of FIGS. 1 and 2 containing the desired currencies are placed in the reader 30 at which the currency and dealer-identifying modes are read and transmitted along a communications line 36 to a central processor 38, which may be located, for example, at a bank or other currency wholesaler. The processor is fed information as at 40, which represents the current exchange or conversion rates for each type of foreign currency sold by the wholesaler to its various retail customers. The data processor 38 processes the received code data and computes the amount in dollars reflecting the quantity of foreign currency in the packet or packets then being scanned in the reader 30. The amount computed in the processor 38 would also include the bank's commission and the retailer's commission on the currency transaction. Processor 38 recognizes the retailer by the received dealer identification code, and then transmits the amount of the transaction to that retailer along a communications line 42. That information is received at the retailer's location where it is displayed on the display 32, and a record of that transaction is printed at printer 34, if desired for the retailer's and customer's record keeping purposes. The information received at the currency retailer from the central processor may also include a separate itemization of the wholesaler's commission, which the retailer is to remit to the wholesaler at a later date.

Among the many advantages of the present invention as described hereinabove, are the ability of the traveler to purchase a desired amount of foreign currency at the time he or she picks up or purchases airline tickets or hotel reservations, and to charge the currency transaction on his or her credit card at the time of those transactions.

While the present invention has been described with respect to a presently preferred embodiment, it will be understood that modifications and variations may be made therein such as by placing the coded strip along a rigid vertical edge rather than along a horizontal upper or lower edge of the packet, without necessarily departing from the spirit and scope of the invention.

What is claimed is:

1. A dispenser packet for selling foreign currency at a currency retail outlet, said packet comprising a flexible currency-containing section for holding a preselected amount of a specified foreign currency, means on one face of said packet for visually displaying the type and amount of foreign currency contained in said currency-containing section, said packet further including at least one rigid edge portion separate from but operatively communicating with and attached to said currency-carrying section and coded means including first machine-readable indicia on said rigid edge portion for identifying the type and amount of currency contained in said currency-containing section and second machine-readable indicia uniquely identifying the retail outlet at which the foreign currency is sold, said rigid edge portion having a thickness sufficient to allow it to pass through a card reader and having a dimension normal to the direction of said coded means of sufficient magnitude to allow said packet to pass through a code reader without said currency-containing section interfering with the movement of the packet through the code reader.

2. The dispenser packet of claim 1, in which said currency-containing section is in the form of an envelope closed at one end, and including first and second edge portions including said at least one rigid edge portion provided at the upper and lower edges of said envelope.

3. A method for dispensing foreign currency at a retail location, said method comprising the steps of placing a specified amount of a foreign currency in a dispenser, said dispenser including a flexible currency-carrying section and at least one rigid edge portion communicating with and attached to said currency-carrying section and being dimensioned to allow said rigid edge portion to pass through a machine-code reader without interference from said currency carrying section, coding said rigid edge portion of said dispenser with first machine-readable indicia identifying the amount and type of currency in said dispenser and second machine-readable indicia uniquely identifying the retail location at which the foreign currency is sold, at said retail location passing said code-carrying rigid edge portion of said dispenser through a code reader for reading said first and second machine-readable indicia on said dispenser, communicating the data obtained by said code reader to a central location remote from said retail location, processing said thus derived data at said remote location to convert the value of the foreign currency in said dispenser to a corresponding value of the domestic currency at the then prevailing conversion rate, and then transmitting the data relating to the converted value of the domestic currency to said retail location.

* * * * *